(12) United States Patent
Ahn et al.

(10) Patent No.: US 7,727,670 B2
(45) Date of Patent: Jun. 1, 2010

(54) ELECTRODE ACTIVE MATERIAL WITH MULTI-ELEMENT BASED OXIDE LAYERS AND PREPARATION METHOD THEREOF

(75) Inventors: Soon Ho Ahn, Daejeon (KR); Byung Hun Oh, Seoul (KR)

(73) Assignee: LG Chem, Ltd. (KR)

( * ) Notice: Subject to any disclaimer, the term of this patent is extended or adjusted under 35 U.S.C. 154(b) by 1304 days.

(21) Appl. No.: 11/219,498

(22) Filed: Sep. 2, 2005

(65) Prior Publication Data

US 2006/0083991 A1    Apr. 20, 2006

(30) Foreign Application Priority Data

Sep. 2, 2004    (KR)    ............ 10-2004-0070094

(51) Int. Cl.
*H01M 4/02* (2006.01)
*H01M 4/48* (2006.01)

(52) U.S. Cl. ............ 429/209; 429/218.1; 429/231.95

(58) Field of Classification Search .............. None
See application file for complete search history.

(56) References Cited

U.S. PATENT DOCUMENTS

| 6,153,333 | A | 11/2000 | Barker | |
|---|---|---|---|---|
| 2002/0114993 | A1* | 8/2002 | Miyaki et al. | 429/137 |
| 2003/0190526 | A1 | 10/2003 | Saidi et al. | |
| 2003/0215715 | A1 | 11/2003 | Barker et al. | |
| 2004/0029014 | A1* | 2/2004 | Hwang et al. | 429/246 |

FOREIGN PATENT DOCUMENTS

| CA | 1287862 | 11/1986 |
|---|---|---|
| CA | 2331602 A1 | 5/1994 |
| CA | 2520876 A1 | 11/2004 |
| JP | 9-55210 | 2/1997 |
| JP | 09055210 | 2/1997 |
| JP | 11-16566 | 1/1999 |
| JP | 11016566 | 1/1999 |
| JP | 2000-149945 | 5/2000 |
| JP | 2000149915 | 5/2000 |
| RU | 2107360 | 3/1998 |
| WO | 0057505 | 9/2000 |
| WO | 2004068616 A2 | 8/2004 |

OTHER PUBLICATIONS

International Search Report dated Sep. 2, 2005 for Applcation No. PCT/KR2005/002909.
Office Action issued by the Canadian Patent Office on Apr. 16, 2009.

* cited by examiner

*Primary Examiner*—Patrick Ryan
*Assistant Examiner*—Alix Echelmeyer
(74) *Attorney, Agent, or Firm*—Cantor Colburn LLP

(57) ABSTRACT

Disclosed is an electrode active material comprising: (a) electrode active material particles capable of lithium intercalation/deintercalation; and (b) a multinary oxide coating layer partially or totally formed on the surface of the electrode active material particles, the multinary oxide coating layer comprising Al, P and a halogen element. A method for preparing the electrode active material, an electrode using the electrode active material, and an electrochemical device comprising the electrode, preferably a lithium secondary battery, are also disclosed. The electrode active material comprising a multinary oxide coating layer has improved structural stability and thermal safety, and thus can provide an electrochemical device having high capacity, long service life and excellent safety.

13 Claims, 2 Drawing Sheets

ELECTRODE ACTIVE MATERIAL WITH MULTI-ELEMENT BASED OXIDE LAYERS AND PREPARATION METHOD THEREOF

This application claims the benefit of the filing date of Korean Patent Application No. 10-2004-0070094, filed on 2. Sep. 2004, in the Korean intellectual Property Office, the disclosure of which is incorporated herein in its entirety by reference.

TECHNICAL FIELD

The present invention relates to an electrode active material comprising a multinary oxide coating layer, a method for preparing the same and an electrode comprising the above electrode active material. Also, the present invention relates to an electrochemical device, preferably a lithium secondary battery, including the above electrode and thus showing high capacity resulting from the application of high voltage, long service life, excellent structural stability and thermal safety.

BACKGROUND ART

Since lithium secondary batteries have been commercialized, the most important object in research and development into batteries is to provide a cathode active material showing excellent electrochemical characteristics including high capacity and long service life. In addition to the above electrochemical characteristics, it is urgently required for a cathode active material to have excellent thermal safety so that a battery system can ensure the safety and reliability even under abnormal conditions such as exposure to heat, combustion or overcharge.

Cathode active materials currently used in lithium secondary batteries include composite metal oxides such as $LiCoO_2$, $LiMn_2O_4$, $LiNiO_2$, $LiNi_{1-x}Co_xO_2$ (0<x<1), $LiMnO_2$, etc. Among those, Mn-containing cathode active materials such as $LiMn_2O_4$, $LiMnO_2$, etc., have advantages in terms of processes for the preparation thereof and cost needed for the preparation thereof. However, such Mn-containing cathode active materials are disadvantageous in that they show low discharge capacity. On the contrary, although $LiCoO_2$ is a typical cathode active material used in most commercially available batteries by virtue of its excellent conductivity, high voltage and excellent electrode characteristics, it is not cost-efficient. Meanwhile, a Ni-containing cathode active material, $LiNiO_2$, shows the highest discharge capacity among the above-described cathode active materials. However, $LiNiO_2$ are problematic in that it shows rapid degradation in terms of service life and significantly poor high-temperature characteristics compared to other cathode active materials.

The above-described cathode active materials are lithium intercalation compounds whose structural stability and capacity are determined by lithium ion intercalation and deintercalation. As a charge voltage increases, capacity of such a lithium intercalation compound increases, while the compound becomes structurally unstable, resulting in a rapid drop in the thermal safety of an electrode. More particularly, such cathode active materials in a charged state show a rapid drop in bonding force between metal ions and oxygen atoms, when the internal temperature of a battery exceeds the critical temperature due to internal or external factors. Therefore, oxygen is decomposed and liberated from such unstable cathode active materials as shown in the following reaction scheme:

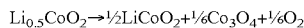

The free oxygen shows high heat-emission property, thereby causing a thermal runaway phenomenon. Further, the free oxygen may cause a highly exothermic reaction with an electrolyte in the battery, resulting in explosion of the battery. Therefore, initiation temperature and heat flow of the reaction, in which oxygen is liberated, should be controlled in order to ensure the battery safety.

In one method suggested for controlling the above-heat flow and initiation temperature, a cathode active material is prepared through a pulverization process and classification process so as to control the surface area of the resultant active material. The average voltage range of an active material having a small particle size is not affected by current density (C rate), because the active material has a large surface area. On the other hand, an active material having a large particle size shows a small surface area, and thus shows an increased surface polarity when it is subjected to high rate charge/discharge, resulting in a drop in average voltage range and capacity.

In order to improve the safety of a cathode active material during charge/discharge cycles, a method for doping a Ni-based or Co-based lithium oxide with a different element was suggested. For example, Japanese Laid-Open Patent No. 12-149945 discloses an active material for improving the quality of $LiNiO_2$, the active material being represented by the formula of $LiNi_xM_yCo_zO_2$ (wherein M is at least one selected from Mn and Al, and x+y+z=1).

Another method for improving the safety of a cathode active material is based on surface modification of a cathode active material. For example, Japanese Laid-Open Patent No. 9-55210 discloses a cathode active material obtained by coating a lithium nickel-based oxide with an alkoxide of Co, Al or Mn, followed by heat treatment. Additionally, Japanese Laid-Open Patent No. 11-16566 discloses a lithium-based oxide coated with a metal selected from the group consisting of Ti, Sn, Bi, Cu, Si, Ga, W, Zr, B and Mo, or an oxide thereof.

However, the above methods according to the prior art cannot increase the initiation temperature where the surface of a cathode active material reacts with an electrolyte (i.e., the exothermic reaction temperature where the oxygen bonded to the metal in the cathode active material is liberated). Moreover, the above methods cannot decrease the amount (heat flow) of oxygen decomposed by such reactions. Ultimately, cathode active materials according to the prior art cannot improve the safety of a battery.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
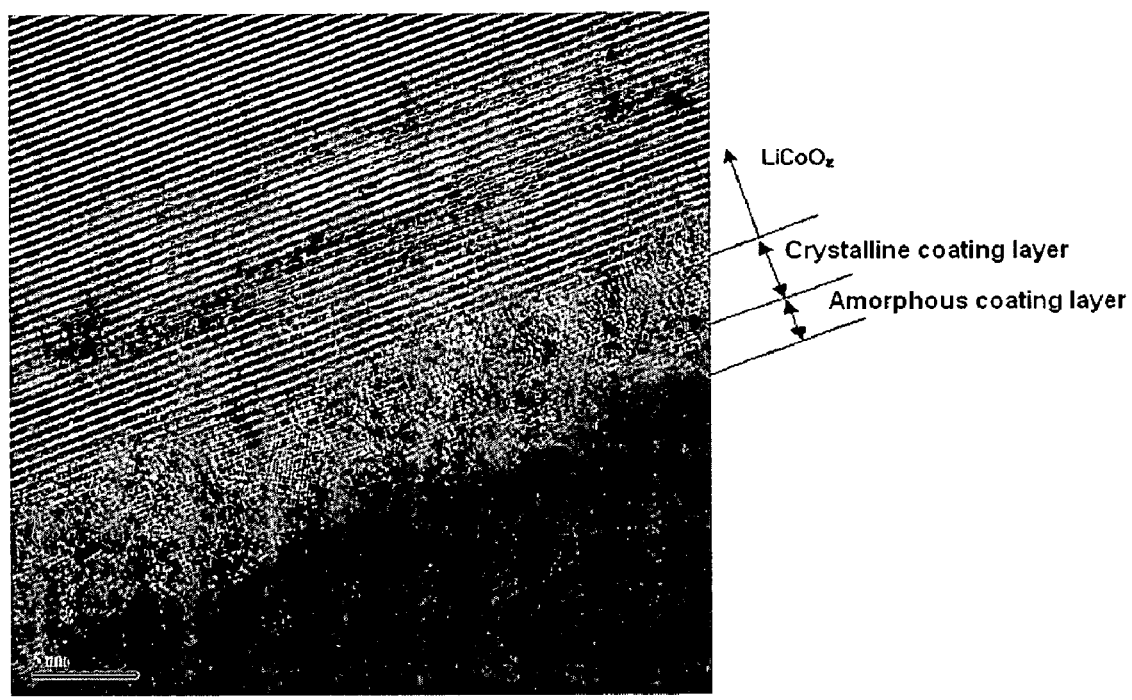
FIG. 1 is a photograph taken by TEM (Transmission Electron Microscope), which shows the electrode active material comprising a multinary oxide coating layer according to Example 1.

Therefore, the present invention has been made in view of the above-mentioned problems. We have found that when a multinary oxide coating layer comprising a combination of Al, P and a halogen element is formed on the surface of electrode active material particles capable of lithium intercalation/deintercalation, it is possible to solve the problem related with the structural instability of an electrode resulting from progress of lithium intercalation during a charge cycle, as well as to inhibit decomposition of oxygen and to prevent the heat emission caused by a reaction of between free oxygen and an electrolyte, thereby improving the thermal safety at the same time.

It is an object of the present invention to provide an electrode active material comprising a multinary oxide coating layer, an electrode using the same electrode active material, and an electrochemical device, preferably a lithium secondary battery, comprising the same electrode.

It is another object of the present invention to provide a surface modification method for improving the structural stability and thermal safety of a cathode.

According to an aspect of the present invention, there is provided an electrode active material comprising: (a) electrode active material particles capable of lithium intercalation/deintercalation; and (b) a multinary oxide coating layer partially or totally formed on the surface of the electrode active material particles, the multinary oxide coating layer comprising Al, P and a halogen element. There are also provided an electrode using the same electrode active material and an electrochemical device, preferably a lithium secondary battery, including the same electrode.

According to another aspect of the present invention, there is provided a method for preparing an electrode active material comprising a multinary oxide coating layer, the method comprising the steps of: (a) dissolving an aluminum precursor compound, phosphorus precursor compound and a halogen precursor compound into a solvent to provide a coating solution; (b) adding electrode active material particles to the coating solution obtained from step (a) and stirring the resultant mixture to cause the electrode active materials to be coated with the coating solution; and (c) heat treating the electrode active material coated in step (b).

According to still another aspect of the present invention, there is provided a method for manufacturing an electrode comprising a multinary oxide coating layer, the method comprising the steps of: (a) dissolving an aluminum precursor compound, phosphorus precursor compound and a halogen precursor compound into a solvent to provide a coating solution; (b) applying the coating solution to the surface of a pre-formed electrode or mixing the coating solution with electrode materials to provide an electrode; and (c) drying the electrode.

Hereinafter, the present invention will be explained in more detail.

The present invention is characterized in that a multinary oxide coating layer is formed on the surface of electrode active material particles capable of lithium intercalation/deintercalation, wherein the multinary oxide coating layer improves structural stability of the electrode so as to permit high-voltage charging/discharging, as well as improves thermal safety of the electrode active material under heat exposure conditions.

(1) Conventional electrode active materials, particularly cathode active materials experience a rapid drop in structural stability when the lithium deintercalation amount increases during repeated charge/discharge cycles under high voltage conditions. As a result of this, bonding force between a metal and oxygen in a lithium-containing metal composite oxide is weakened. Therefore, when a battery using the conventional electrode active material is exposed to heat generated due to external and/or internal factors, oxygen is liberated and thus the battery may be ignited.

However, the electrode active material according to the present invention can improve the structural stability of an electrode, because the multinary oxide coating layer formed on the surface of electrode active material particles shows excellent doping capability, maintenance and bonding force with oxygen. Therefore, the electrode active material according to the present invention can provide a battery with excellent overall qualities, including high capacity and long service life. Additionally, the multinary oxide coating layer can inhibit liberation of oxygen by virtue of its strong bonding force with oxygen even under a significantly low content of lithium ions during a charge cycle. Therefore, it is possible to prevent a rapid increase in temperature caused by a reaction between oxygen and an electrolyte, thereby contributing to improvement in the thermal safety of a battery.

(2) Additionally, the multinary oxide coating layer may be present in an amorphous form, crystalline form or a mixed form thereof. Particularly, when the outermost layer of the coating layer is amorphous, it is possible to inhibit a rapid side reaction between an electrode active material (particularly, a cathode active material) and electrolyte, and to prevent rapid transfer of lithium even under internal short circuit conditions. Therefore, the multinary oxide coating layer according to the present invention can contribute to improvement of battery safety.

One component of the multinary oxide coating layer partially or totally formed on the surface of electrode active material particles according to the present invention is a substance that has such a small atom size as to facilitate doping to the surface of electrode active material particles and thus improves the structural stability of an electrode during lithium intercalation progress. Preferably, the first component is aluminum (Al).

Another component of the multinary oxide coating layer may be a substance having strong bonding force to oxygen. Preferably, the second component is phosphorus (P), because phosphorus can inhibit liberation of oxygen caused by the structural instability of a lithium intercalation compound and can prevent heat emission caused by a reaction of free oxygen with an electrolyte, thereby improving the safety of an electrode (particularly, a cathode).

Still another component of the multinary oxide coating layer may be a substance having high electron affinity. Particularly, halogen elements (X) such as fluorine, chlorine, bromine and iodine are preferred as the third component. Because halogen atoms can be bonded strongly with oxygen present on the surface of an electrode and with incompletely bonded transition metals (for example, Co, Mn, Ni, etc.) so that the layered structure of the electrode surface can be maintained continuously, they can improve the structural stability and thermal safety of an electrode at the same time.

As described above, a preferred composition of the multinary oxide coating layer comprises aluminum, phosphorus and a halogen element, the multinary oxide coating layer being formed on the surface of electrode active material particles to improve the structural stability and thermal safety of the electrode. Any compositions having the same characteristics and providing the same effects as described above may also be used. Additionally, a multinary (higher than ternary) coating layer comprising another element in addition to the above composition of three elements is also included in the scope of the present invention.

Preferably, the multinary oxide coating layer partially or totally formed on the surface of electrode active material particles is a compound represented by the following formula 1:

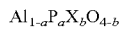
$$Al_{1-a}P_aX_bO_{4-b}$$ [Formula 1]

wherein X is a halogen element, 0<a<1 and 0<b<1.

The multinary oxide coating layer according to the present invention, which comprises a combination of the above-described elements, may be present in an amorphous form, crystalline form or a mixed form thereof. Particularly, a coating layer present in a mixed amorphous/crystalline form is preferred, as described above. Additionally, there is no particular limitation in thickness of the multinary oxide coating layer and the thickness can be controlled in such a range as to improve the structural stability and thermal safety of an electrode.

Although there is no particular limitation to the amount of the compound forming the multinary oxide coating layer according to the present invention, it is preferable to use the compound in an amount between 0.1 and 10 parts by weight per 100 parts by weight of an electrode active material. If the multinary oxide coating layer is used in an amount of less than 0.1 parts by weight, it is not possible to improve the structural stability of an electrode (particularly, a cathode) when Li intercalation potential increases. On the other hand, if the multinary oxide coating layer is used in an amount of greater than 10 parts by weight, charge/discharge capacity of a battery decreases due to a relatively small amount of the electrode active material.

The electrode active material comprising a multinary oxide coating layer according to the present invention may be prepared by using a conventional coating method known to one skilled in the art. One embodiment of such methods comprises the steps of: (a) dissolving an aluminum precursor compound, phosphorus precursor compound and a halogen precursor compound into a solvent to provide a coating solution; (b) adding electrode active material particles to the coating solution obtained from step (a) and stirring the resultant mixture to cause the electrode active materials to be coated with the coating solution; and (c) heat treating the electrode active material coated in step (b).

1) More particularly, in the first step, an aluminum precursor compound, phosphorus precursor compound and a halogen precursor compound are dissolved into a solvent to provide a coating solution.

Each of the aluminum precursor compound, phosphorus precursor compound and a halogen precursor compound may be an ionizable and water soluble or water insoluble compound containing the corresponding element. Non-limiting examples of such compounds include alkoxide, nitrate, acetate, halide, hydroxide, oxide, carbonate, oxalate, sulfate or mixtures thereof, containing each element. Particular preferred examples of such compounds include aluminum alkoxide, aluminum nitrate, aluminum hydroxide, aluminum oxide, aluminum acetate, aluminum sulfate, aluminum chloride, aluminum bromide, monododecyl phosphate, diammonium hydrogen phosphate, phosphoric acid, etc. Compounds containing at least one of the above elements or combinations of the above elements may also be used in the present invention.

Solvents that may be used in the present invention include conventional solvents capable of ionization of the above compounds. Non-limiting examples of such solvents include water or organic solvents such as alcohols.

2) Next, electrode active material particles are added to the coating solution obtained from the preceding step and the resultant mixture is stirred to cause the electrode active materials to be coated with the coating solution.

Cathode active materials that may be used in the present invention include conventional cathode active materials known to one skilled in the art (for example, lithium-containing composite oxides having at least one element selected from the group consisting of alkali metals, alkaline earth metals, Group 13 elements, Group 14 elements, Group 15 elements, transition metals, rare earth elements and combinations thereof). Chalcogenide compounds may also be used in the present invention. Non-limiting examples of the cathode active materials include various types of lithium transition metal composite oxides including lithium manganese composite oxides, lithium cobalt composite oxides, lithium nickel composite oxides, lithium iron composite oxides or combinations thereof (for example, $LiCoO_2$, $LiNiO_2$, $LiMnO_2$, $LiMn_2O_4$, $LiNi_{1-x}Co_xM_yO_2$ (M=Al, Ti, Mg, Zr, 0<X≦1, 0≦Y≦0.2), $LiNi_xCo_yMn_{1-X-Y}O_2$ (0<X≦0.5, 0<Y≦0.5), etc.), or lithium intercalation materials such as $TiS_2$, $SeO_2$, $MoS_2$, $FeS_2$, $MnO_2$, $NbSe_3$, $V_2O_5$, $V_6O_{13}$, $CuCl_2$ or mixtures thereof.

Additionally, anode active materials may include any conventional anode active materials currently used in an anode of a conventional electrochemical device. Preferably, the anode active material includes materials capable of lithium intercalation/deintercalation, such as lithium metal, lithium alloys, carbon, petroleum coke, activated carbon, graphite or other carbonaceous materials.

In this step, a conventional coating process currently used in the art may be used. Non-limiting examples of such coating processes include a solvent evaporation process, co-precipitation process, precipitation process, sol-gel process, adsorption process followed by filtering, sputtering process, CVD (chemical vapor deposition) process, or the like.

3) Finally, the electrode active material coated with the multinary precursor compounds is dried and then heat treated.

There is no particular limitation in temperature and time used in the heat treatment. Preferably, heat treatment is carried out at a temperature of 100-700° C. for 1-20 hours (more preferably, for 2-5 hours).

The present invention also provides an electrode using the electrode active material comprising a multinary oxide coating layer. Preferably, the electrode according to the present invention is a cathode.

In order to manufacture an electrode by using the electrode active material comprising a multinary oxide coating layer, conventional methods known to one skilled in the art may be used. In one embodiment of such methods, the electrode active material comprising a multinary oxide coating layer according to the present invention is used as cathode active material and/or anode active material (preferably, as cathode active material). Then the electrode active material is mixed with a binder to provide electrode slurry and the resultant electrode slurry is coated and dried on a current collector to complete the manufacture of an electrode.

Binders that may be used include polytetrafluoroethylene (PTFE), polyvinylidene fluoride (PVdF), etc.

There is no particular limitation in the current collector as long as it is formed of a conductive material. However, particularly preferred examples of a cathode current collector include foil formed of aluminum, nickel or a combination thereof. Non-limiting examples of an anode current collector include foil formed of copper, gold, nickel, copper alloys or a combination thereof. Although there is no particular limitation in shape and thickness of the current collector, it is preferable to use a current collector taking the form of a sheet having a currently used range of thickness (i.e., a thickness of 0.001-0.5 mm).

There is no particular limitation in selection of the process for applying electrode slurry to a current collector and conventional processes known to one skilled in the art may be used. For example, electrode slurry may be applied to a current collector through a doctor blade coating, dipping or brushing process. Also, there is no particular limitation in amount of electrode slurry applied to a current collector. However, it is preferable that electrode slurry is applied in such an amount as to leave an active material layer having a thickness of 0.005-5 mm (preferably of 0.05-2 mm) after the removal of a solvent or dispersant. It is a matter of course that there is no particular limitation in selection of the process for removing a solvent or dispersant. However, it is preferable to use a process for carrying out rapid evaporation of a solvent or dispersant within such a range of speed as to prevent cracking in the active material layer caused by concentration of stress or to prevent separation of the active material from a current collector.

Another embodiment of the method for manufacturing the electrode according to the present invention comprises the steps of: (a) dissolving an aluminum precursor compound, phosphorus precursor compound and a halogen precursor compound into a solvent to provide a coating solution; (b) applying the coating solution to the surface of a preliminarily formed electrode, or mixing the coating solution with electrode materials to provide an electrode; and (c) drying the electrode. However, it is to be understood that the above-described method does not limit the scope of the present invention.

More particularly, in step (b) for mixing the coating solution with electrode materials, an electrode active material is mixed with the coating solution to form electrode slurry, and then the resultant electrode slurry is applied to a current collector.

As described above, the present invention also provides an electrochemical device comprising a cathode, anode, separator interposed between both electrodes and an electrolyte, wherein either or both of the cathode and anode are the electrodes comprising the multinary oxide coating layer according to the present invention.

Such electrochemical devices include any devices in which electrochemical reactions occur and particular examples thereof include all kinds of primary batteries, secondary batteries, etc.

The electrochemical device may be manufactured by a conventional method known to one skilled in the art. For example, a separator is interposed between a cathode and anode to provide an electrode assembly and then an electrolyte is injected thereto.

Particularly, it is preferable that the electrochemical device is a lithium secondary battery such as a secondary lithium metal battery, secondary lithium ion battery, secondary lithium polymer battery or a secondary lithium ion polymer battery.

Although there is no particular limitation in the separator that may be used in the present invention, it is preferable to use porous separators including polypropylene-, polyethylene- or polyolefin-based porous separators.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone; GBL) and mixtures thereof. However, the electrolyte that may be used in the present invention is not limited to the above examples.

Although there is no particular limitation in shape of the electrochemical device (preferably, lithium secondary battery) according to the present invention, the electrochemical device may have a cylindrical, coin-like, prismatic, or a pouch-like shape.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

1-1. Preparation of Electrode Active Material 30 g of aluminum bromide was dissolved in 1.0 M dibromomethane, 100 g of $LiCoO_2$ powder (available from Nippon Chem., Co.) having a particle diameter of 10 μm was added thereto, and then the resultant mixture was stirred for 10 minutes. Next, 0.4 g of monododecyl phosphate ($C_{12}H_{25}OPO(OH)_2$) was added to the above mixture and the resultant mixture was stirred continuously at a temperature of 30° C. for 1 hour. After stirring, the mixture in a slurry state was dried completely in an oven at 100° C. for 5 hours, heat treated at 600° C. for 5 hours, and then cooled gradually. During the heat treatment, temperature was increased at a rate of 100° C./minute.

1-2. Manufacture of Lithium Secondary Battery 94 wt % of the electrode active material obtained from the above Example 1-1, 3 wt % of a conductive agent (Super P carbon black) and a binder (PVdF) were mixed homogeneously and N-methylpyrrolidone (NMP) was added thereto as solvent to provide homogeneous slurry. The slurry was applied to one surface of aluminum foil and dried in a vacuum oven at 100° C. to remove water, thereby providing a cathode. Lithium metal as anode, a porous polyethylene film as separator and ED/DEC (1:1)-based liquid electrolyte containing 1M $LiPF_6$ were used to manufacture a coin-type half battery.

EXAMPLE 2

Example 1 was repeated to provide an electrode active material, a cathode using the same electrode active material and a coin-type battery comprising the same cathode, except that 60 g of aluminum bromide and 0.8 g of monododecyl phosphate were used instead of 30 g of aluminum bromide and 0.4 g of monododecyl phosphate, respectively.

EXAMPLE 3

Example 1 was repeated to provide an electrode active material, a cathode using the same electrode active material and a coin-type battery comprising the same cathode, except that 90 g of aluminum bromide and 1.2 g of monododecyl phosphate were used instead of 30 g of aluminum bromide and 0.4 g of monododecyl phosphate, respectively.

COMPARATIVE EXAMPLE 1

Example 1 was repeated to provide a cathode and a coin-type battery comprising the same cathode, except that 100 g of $LiCoO_2$ powder (available from Nippon Chem., Co., particle diameter: 10 μm) currently used in the art was used as cathode active material.

EXPERIMENTAL EXAMPLE 1

Surface Analysis for Electrode Active Materials

The following experiment was carried out with a transmission electron microscope (TEM) in order to evaluate the surface of the electrode active material comprising a multinary oxide coating layer according to the present invention.

The electrode active material according to Example 1 was used as sample.

After the TEM analysis, it could be shown that the electrode active material according to the present invention included a multinary oxide coating layer comprising Al, P and Br, uniformly formed on the surface. Particularly, the multinary oxide coating layer was formed of two layers, wherein the surface of a coating layer adjacent to the electrode active material ($LiCoO_2$) included Al, P and Br elements present in a crystalline form, while the outermost coating layer included Al, P and Br elements present as amorphous layer in the form of a compound.

EXPERIMENTAL EXAMPLE 2

Evaluation for Quality of Lithium Secondary Battery

The following tests were carried out in order to evaluate the quality of a lithium secondary battery using the electrode active material comprising a multinary oxide coating layer according to the present invention.

2-1. Thermal Safety Test

To determine the thermal safety of each of the coin-type batteries according to Example 1, Example 2 and Comparative Example 1, the following DSC (differential scanning calorimetry) analysis was performed.

After each battery was charged to 4.6V, electrode plates were separated. Only the electrode active materials were collected from the separated electrode plates and then sealed completely in a high-pressure sample can. Next, DSC analysis was carried out by using Q100 (available from TA company). During the DSC analysis, each sample was scanned at a heating rate of 5° C./minute in a temperature range of from 40° C. to 400° C. The results are shown in FIG. 2.

Meanwhile, thermal safety of a battery can be evaluated in terms of heat-emission initiation temperature and heat flow. It is thought that a battery of good quality shows a high peak temperature, where the maximum heat-emission peak is present, and provides a gentle slope in heat flow starting from the initiation of heat-emission.

After the analysis, the battery according to Comparative Example 1, using non-coated $LiCoO_2$ as cathode active material, showed heat-emission peaks at about 170° C. and 230° C. (see, FIG. 2). The peak at 170° C. indicates the heat emission caused by decomposition (liberation) of oxygen from the cathode active material and reactions between the free oxygen and electrolyte. Additionally, the peak at 230° C. indicates the heat emission caused by combination of several factors including decomposition of oxygen, reactions between the free oxygen and electrolyte and collapse of the cathode. Particularly, the highest heat-emission peak present at 230° C. indicates that a significant amount of heat flow is generated by decomposition (liberation) of oxygen and reactions between the free oxygen and electrolyte (see, FIG. 2). Such high heat emission results from weakening of Co—O bonds of the $LiCoO_2$ cathode active material in a charged state and decomposition of oxygen, followed by reactions between the free oxygen and electrolyte.

Figure 2:
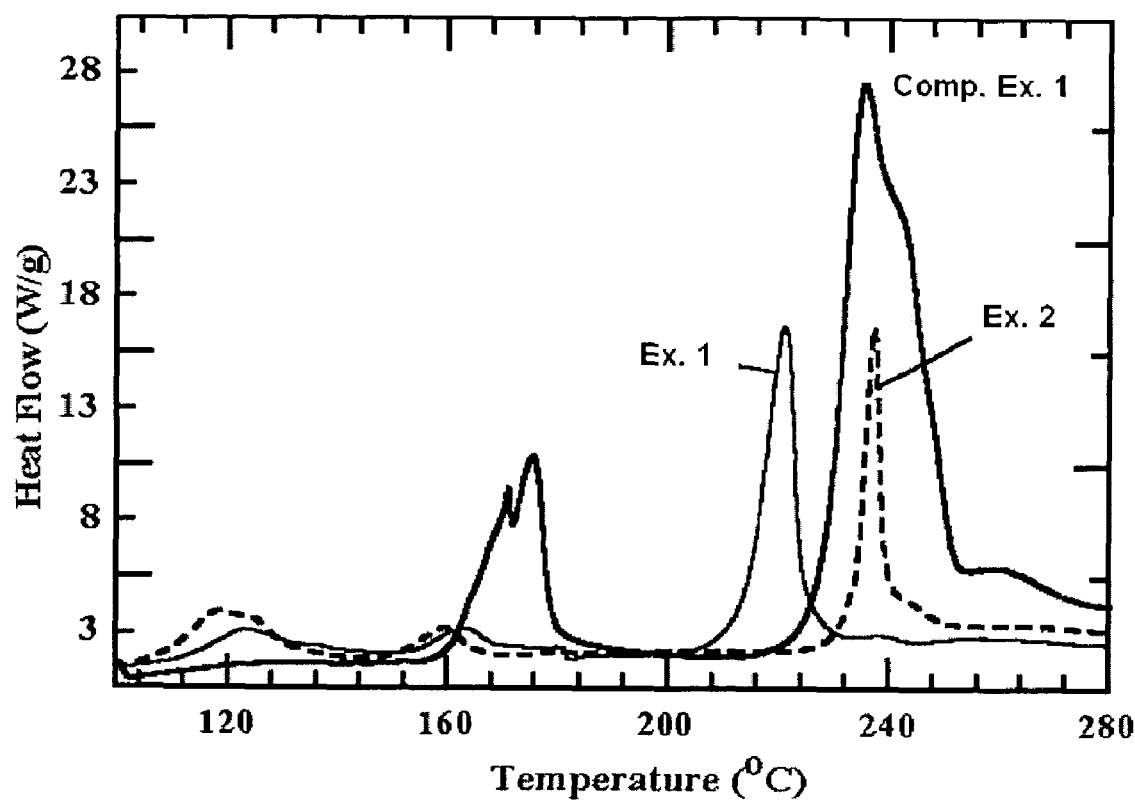
FIG. 2 is a graph showing the results of DSC (Differential Scanning Calorimetry) for each of the lithium secondary batteries according to Example 1, Example 2 and Comparative Example 1.

On the contrary, the lithium secondary batteries according to Examples 1 and 2, each using the electrode active material comprising a multinary oxide coating layer according to the present invention, showed a significantly decreased heat flow (see, FIG. 2). This indicates that the multinary oxide coating layer formed on the surface of the cathode active material inhibits liberation of oxygen by virtue of its strong bonding force to oxygen even under a low content of lithium ions in a charged state, and thus efficiently prevents a rapid increase in temperature caused by a reaction of between the free oxygen and electrolyte.

As can be seen from the above results, the electrode active material comprising a multinary oxide coating layer according to the present invention shows excellent thermal safety.

2-2. Test for Battery Capacity

The following test was performed to measure the capacity for each of the lithium secondary batteries using the electrode active material comprising a multinary oxide coating layer according to Examples 1 to 3. As control, the battery according to Comparative Example 1, using non-coated $LiCoO_2$ as cathode active material, was used.

Each battery was subjected to a charge/discharge cycle at 0.1 C in a voltage range of between 3V and 4.6V and then to 30 charge/discharge cycles at 1 C. The results are shown in the following Table 1.

After the test, the battery using a conventional cathode active material according to Comparative Example 1 showed an initial charge/discharge capacity similar to that of each battery according to Examples 1 to 3. However, the battery according to Comparative Example 1 showed a rapid drop in discharge capacity during repeated charge/discharge cycles. On the contrary, the batteries according to Examples 1 to 3 showed a significant high discharge capacity and capacity maintenance even after 30 charge/discharge cycles at 1 C (see, Table 1), while showing an initial charge/discharge capacity similar to that of the battery according to Comparative Example 1. This indicates that the multinary oxide coating layer formed on the surface of electrode active material can improve the structural stability of an electrode.

As can be seen from the above results, the electrode active material comprising a multinary oxide coating layer according to the present invention improves the structural stability of an electrode, and thus provides a battery with high capacity and long service life.

TABLE 1

| Battery | 0.1 C discharge capacity (mAh/g) | 1 C initial capacity (mAh/g) | 1 C capacity after 30 cycles (mAh/g) |
|---|---|---|---|
| Ex. 1 | 215 | 185 | 170 |
| Ex. 2 | 215 | 190 | 175 |
| Ex. 3 | 212 | 190 | 175 |
| Comp. Ex. 1 | 212 | 170 | 100 |

INDUSTRIAL APPLICABILITY

As can be seen from the foregoing, the electrode active material according to the present invention comprises a multinary oxide coating layer comprising Al, P and a halogen element, the coating layer being partially or totally formed on the surface of a conventional electrode active material. By virtue of the multinary oxide coating layer, it is possible to improve the structural stability of an electrode so as to permit high-voltage charging/discharging and to improve the thermal safety of the electrode active material, resulting in improvement in the safety of a battery under heat exposure conditions. Therefore, the present invention can provide an electrochemical device having high capacity, long service life and excellent safety.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A cathode active material, comprising:
   lithium-containing composite oxide particles capable of lithium intercalation/deintercalation; and
   a multinary oxide coating layer partially or totally formed on a surface of the lithium-containing composite oxide particles, wherein the multinary oxide coating layer comprises a compound represented by Formula 1:

$$Al_{1-a}P_aX_bO_{4-b}$$      Formula 1 wherein X is Br, 0<a<1 and 0<b<1.

2. The cathode active material according to claim 1, wherein the multinary oxide coating layer is in an amorphous form, a crystalline form or a mixed form thereof.

3. The cathode active material according to claim 1, wherein the multinary oxide coating layer is used in an amount of 0.1-10 parts by weight per 100 parts by weight of the lithium-containing composite oxide particles.

4. A cathode, comprising:
   a cathode active material, wherein the cathode active material comprises
   lithium-containing composite oxide particles capable of lithium intercalation/deintercalation; and
   a multinary oxide coating layer partially or totally formed on the surface of the lithium-containing composite oxide particles, the multinary oxide coating layer comprising a compound represented by Formula 1:

$$Al_{1-a}P_aX_bO_{4-b}$$      Formula 1 wherein X is Br, 0<a<1 and 0<b<1.

5. The cathode according to claim 4, wherein the multinary oxide coating layer is in an amorphous form, crystalline form or a mixed form thereof.

6. The cathode according to claim 4, wherein the multinary oxide coating layer is used in an amount of 0.1-10 parts by weight per 100 parts by weight of the lithium-containing composite oxide particles.

7. An electrochemical device, comprising:
   a cathode;
   an anode;
   a separator; and
   an electrolyte, wherein the cathode comprises a cathode active material comprising
   lithium-containing composite oxide particles capable of lithium intercalation/deintercalation; and
   a multinary oxide coating layer partially or totally formed on the surface of the lithium-containing composite oxide particles,
   wherein the multinary oxide coating layer comprises a compound represented by Formula 1:

$$Al_{1-a}P_aX_bO_{4-b}$$      Formula 1 wherein X is Br, 0<a<1 and 0<b<1.

8. The electrochemical device according to claim 7, wherein the multinary oxide coating layer is in an amorphous form, crystalline form or a mixed form thereof 9. The electrochemical device according to claim 7, wherein the multinary oxide coating layer is used in an amount of 0.1-10 parts by weight per 100 parts by weight of the lithium-containing composite oxide particles.

10. The electrochemical device according to claim 7, wherein the electrochemical device is a lithium secondary battery.

11. A method for preparing the electrode active material as defined in claim 1, which comprises the steps of:
    (a) dissolving an aluminum precursor compound, phosphorus precursor compound and a halogen precursor compound into a solvent to provide a coating solution;
    (b) adding electrode active material particles to the coating solution obtained from step (a) and stirring the resultant mixture to cause the electrode active materials to be coated with the coating solution; and
    (c) heat treating the electrode active material coated in step (b).

12. A method for manufacturing an electrode comprising a multinary oxide coating layer, which comprises the steps of:
    (a) dissolving an aluminum precursor compound, phosphorus precursor compound and a halogen precursor compound into a solvent to provide a coating solution;
    (b) applying the coating solution to the surface of a preformed electrode, or mixing the coating solution with electrode materials to provide an electrode; and
    (c) drying the electrode.

13. The method according to claim 12, wherein step (b) of mixing the coating solution with electrode materials is carried out by mixing the coating solution with an electrode active material to form electrode slurry and applying the resultant electrode slurry to a current collector.

* * * * *